United States Patent
Zeng et al.

(10) Patent No.: US 12,267,495 B2
(45) Date of Patent: Apr. 1, 2025

(54) AFFINE PREDICATION METHOD, COMPUTING DEVICE AND NON-TRANSITORY STORAGE MEDIUM

(71) Applicant: ZHEJIANG DAHUA TECHNOLOGY CO., LTD., Hangzhou (CN)

(72) Inventors: Feiyang Zeng, Hangzhou (CN); Dong Jiang, Hangzhou (CN); Jucai Lin, Hangzhou (CN); Jun Yin, Hangzhou (CN); Cheng Fang, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 115 days.

(21) Appl. No.: 17/696,890

(22) Filed: Mar. 17, 2022

(65) Prior Publication Data
US 2022/0210413 A1    Jun. 30, 2022

Related U.S. Application Data (63) Continuation of application No. PCT/CN2020/116275, filed on Sep. 18, 2020.

(30) Foreign Application Priority Data

Sep. 18, 2019   (CN) .......................... 201910883011.1

(51) Int. Cl.
*H04N 19/119*   (2014.01)
*H04N 19/139*   (2014.01)
(Continued)

(52) U.S. Cl.
CPC ......... *H04N 19/119* (2014.11); *H04N 19/139* (2014.11); *H04N 19/147* (2014.11); *H04N 19/176* (2014.11); *H04N 19/537* (2014.11)

(58) Field of Classification Search
None
See application file for complete search history.

(56) References Cited

U.S. PATENT DOCUMENTS

2018/0270500 A1    9/2018    Li et al.
2020/0099945 A1*   3/2020    Pham Van ........... H04N 19/433
(Continued)

FOREIGN PATENT DOCUMENTS

| CN | 108781284 A | 11/2018 |
| CN | 110024403 A | 7/2019 |

(Continued)

OTHER PUBLICATIONS

Y-L Hsiao et al: "CE2-5.3: Simplifications or inherited affine merging candidates", 126. MPEG Meeting; Mar. 25, 2019-Mar. 29, 2019; Geneva; (Motion Picture Expert Group or ISO/IEC JTC1/SC29/WG11), No. m46732 Mar. 17, 2019, XP030209014(3 pages).

(Continued)

*Primary Examiner* — Clifford Hilaire (57) ABSTRACT

An affine prediction method, a computing device and a non-transitory storage medium are disclosed. The method includes obtaining a current coding block comprising a plurality of sub-blocks arranged in an array; dividing the current coding block into at least two areas, wherein each area of the at least two areas comprises two or more of the sub-blocks; setting a corresponding control point motion vector (CPMV) for one or more control points in the each area, respectively; and affine-predicting motion vectors (MVs) of the two or more of the sub-blocks in the each area, using the corresponding CPMV.

18 Claims, 4 Drawing Sheets

(51) Int. Cl.
*H04N 19/147* (2014.01)
*H04N 19/176* (2014.01)
*H04N 19/537* (2014.01)

(56) References Cited

U.S. PATENT DOCUMENTS

| | | | |
|---|---|---|---|
| 2020/0120335 A1* | 4/2020 | Hung | H04N 19/513 |
| 2020/0213585 A1* | 7/2020 | Huang | G06F 1/03 |
| 2021/0392322 A1* | 12/2021 | Chiang | H04N 19/51 |

FOREIGN PATENT DOCUMENTS

| | | |
|---|---|---|
| CN | 110178371 A | 8/2019 |
| CN | 110636301 A | 12/2019 |
| EP | 3291557 A1 | 3/2018 |
| EP | 3343923 A1 | 7/2018 |
| EP | 3468196 A1 | 4/2019 |
| WO | WO2017147765 A1 | 9/2017 |
| WO | WO2019029590 A1 | 2/2019 |
| WO | WO2019069601 A1 | 4/2019 |
| WO | WO2019160860 A1 | 8/2019 |

OTHER PUBLICATIONS

European search report, EP20866113.2, mailed Oct. 19, 2022 (9 pages).
On Affine Motion Vectors.
Non-CE4-Adaptive subblock size for affine motion compensation.
Notification to Grant Patent Right for Invention, Chinese Application No. 201910883011.1, mailed May 8, 2021 (6 pages).
International search report, International Application No. PCT/CN2020/116275, mailed Dec. 23, 2020 (9 pages).

* cited by examiner

AFFINE PREDICATION METHOD, COMPUTING DEVICE AND NON-TRANSITORY STORAGE MEDIUM

CROSS-REFERENCE TO RELATED APPLICATIONS

The present application is a continuation of International Patent Application No. PCT/CN2020/116275, filed Sep. 18, 2020, which claims a priority to Chinese Patent Application No. 201910883011.1 filed on Sep. 18, 2019, the entire disclosures of which are incorporated herein by reference.

TECHNICAL FIELD

The present disclosure generally relates to the technical field of video-coding, and in particular to an affine predication method, a computing device, and a non-transitory storage medium.

BACKGROUND

For inter prediction technology of H.266 standard, the largest size of a coding block may be 128×128. The affine prediction can be applied for coding blocks with a size greater than or equal to 8×8. Each coding block is further divided into multiple 4×4 sub-blocks, and a motion vector (MV) of each sub-block is obtained as 2 or 3 control point motion vectors (CPMVs) are weighted according to a location relationship.

However, when the coding block is large, the existing methods fail to guarantee the prediction-accuracy of the entire coding block, because the farther a sub-block is from a control point (CP), the less accurate MV prediction of the sub-block using CPMV is, and the less accurate a predicted value generated by motion compensation.

SUMMARY

According to one aspect of the present disclosure, an affine prediction method is provided, which includes obtaining a current coding block comprising a plurality of sub-blocks arranged in an array; dividing the current coding block into at least two areas, wherein each area of the at least two areas comprises two or more of the plurality of sub-blocks; setting a corresponding control point motion vector (CPMV) for one or more control points in the each area, respectively; and affine-predicting motion vectors (MVs) of the two or more of the plurality of sub-blocks in the each area, using the corresponding CPMV.

According to another aspect of the present disclosure, a computing device is provided, comprising a processor and a memory, the processor being coupled to the memory, and the memory being configured for storing programs, when executed by the processor, causes the processor to implement obtaining a current coding block comprising a plurality of sub-blocks arranged in an array; dividing the current coding block into at least two areas, wherein each area of the at least two areas comprises two or more of the plurality of sub-blocks; setting a corresponding control point motion vector (CPMV) for one or more control points in the each area, respectively; and affine-predicting motion vectors (MVs) of the two or more of the plurality of sub-blocks in the each area, using the corresponding CPMV.

According to yet another aspect of the present disclosure, a non-transitory storage medium is provided, which stores programs, when executed, causes to implement obtaining a current coding block comprising a plurality of sub-blocks arranged in an array; dividing the current coding block into at least two areas, wherein each area of the at least two areas comprises two or more of the plurality of sub-blocks; setting a corresponding control point motion vector (CPMV) for one or more control points in the each area, respectively; and affine-predicting motion vectors (MVs) of the two or more of the plurality of sub-blocks in the each area, using the corresponding CPMV.

BRIEF DESCRIPTION OF THE DRAWINGS

In order to make the technical solution described in the embodiments of the present disclosure or in related art more clearly, the drawings used for the description of the embodiments or related art will be briefly described. Obviously, the drawings in the following description are only some embodiments of the present disclosure. For those of ordinary skill in the art, other drawings can be obtained based on these drawings without creative work.

DETAILED DESCRIPTION

To make any one of skill in the art to understand the technical solutions of the present disclosure, the present disclosure will be described in detail by referring to the drawings and the embodiments. Obviously, the described embodiments are only a part of the embodiments of the present disclosure, not all of the embodiments. Based on the embodiments in the present disclosure, all other embodiments obtained by those of ordinary skills in the art without creative efforts shall fall within the scope of the present disclosure.

Terms of "first", "second", "third" and the like in the present disclosure are for descriptions only and should not be interpreted as indicating or implying relative importance or implicitly indicating the number of technical features. Therefore, at least one of features defined as "first", "second", "third" and the like may be explicitly or implicitly included. In the description of the present disclosure, terms of "a plurality" refer to a number of at least two, for example, two, three, etc., unless it is specifically defined. All directional indications (such as up, down, left, right, front, back, etc.) in the embodiments of the present disclosure are only to explain relative positional relationship, movements and the like among components in a specific status (as shown in the drawings). If the specific status changes, the directional indications may change accordingly. Furthermore, terms of "include", "comprise" and any variations thereof are intended to cover non-exclusive inclusion. For example, a process, method, system, product, or device including a series of operations or units is not limited to the listed operations or units, but alternatively also includes operations or units that are not listed, or alternatively also includes other operations or units inherent to the process, method, system, product or device.

As for "embodiments" herein, particular features, structures, or characteristics described in connection with the embodiments may be included in at least one embodiment of the present disclosure. The appearances of this phrase in various places in the specification are neither necessarily all referring to the same embodiment, nor independent or alternative embodiments that are mutually exclusive with other embodiments. It is clearly and implicitly understood by those of ordinary skills in the art that the embodiments described herein may be combined with other embodiments.

Figure 1:
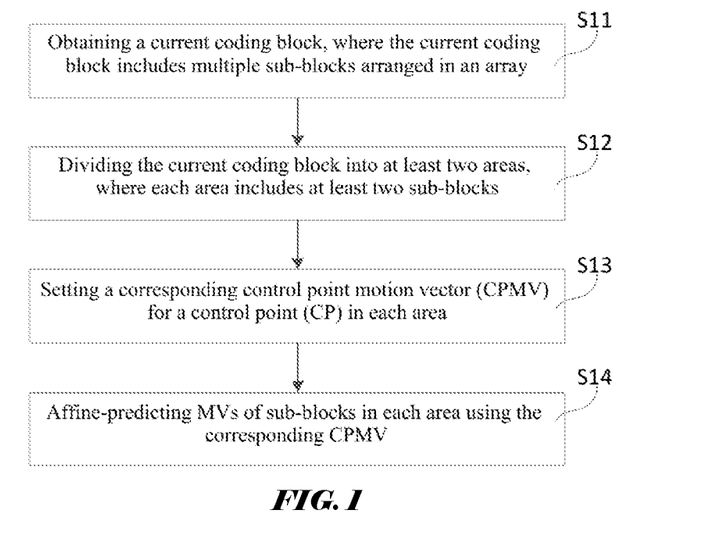
FIG. 1 is a schematic flowchart of an affine prediction method according to some embodiments of the present disclosure.

FIG. 1 is a schematic flowchart of an affine prediction method according to some embodiments of the present disclosure. In this embodiment, the affine prediction method includes actions/operations in the following.

At S11, the method obtains a current coding block, where the current coding block includes multiple sub-blocks arranged in an array.

The current coding block is an image area that is to be coded in a current frame. Image areas in the current frame are sequentially coded in a certain order, and the current coding block is an image area which is to be coded next time in this order in the current frame. The current coding block can have multiple sizes, such as 16×16, 32×32, or 32×16, where numbers represent the number of rows of pixels and the number columns of pixels in the current coding block, respectively.

The current coding block includes multiple sub-blocks arranged in an array. A sub-block is a set of pixels with a small size. The sub-block usually has a size of 4×4. The sub-block can also have a size of 4×4, 8×4, or 8×8. The sub-blocks of the current coding block have a uniform size.

Thus, after the current coding block is obtained, the current coding block is divided into multiple sub-blocks arranged in an array and having a uniform size.

At S12, the method divides the current coding block into at least two areas, where each area includes at least two sub-blocks.

The current coding block is partitioned/split into at least two areas, and each area includes at least two sub-blocks.

Figure 2:
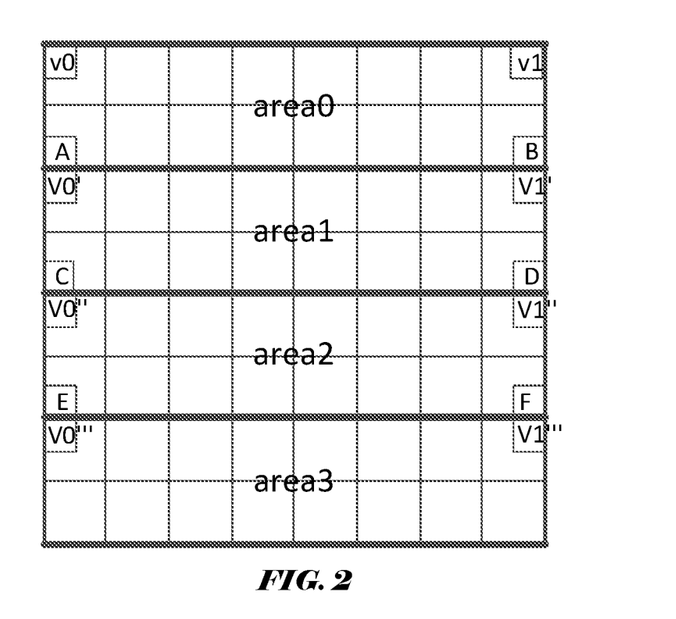
FIG. 2 is a schematic diagram of horizontal division of a current coding block in the process of FIG. 1.

Alternatively, as shown in FIG. 2, horizontal division is used for the current coding block, and thus, the current coding block is divided into multiple areas arranged in a column direction.

Figure 3:
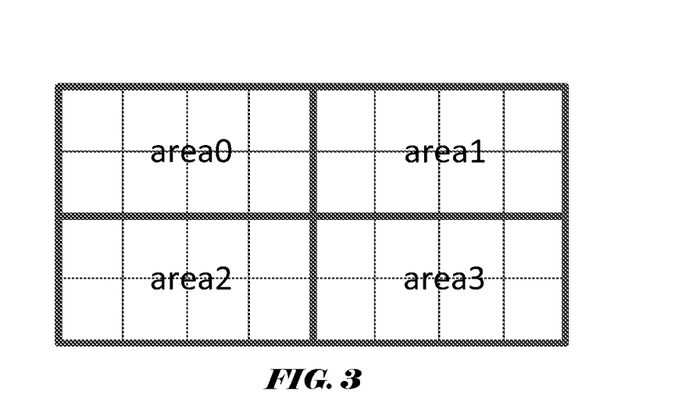
FIG. 3 is a schematic diagram of horizontal division and vertical division of a current coding block in the process of FIG. 1.

Alternatively, as shown in FIG. 3, vertical division is used for the current coding block, and thus, the current coding block is divided into multiple areas arranged in a row direction.

Alternatively, as shown in FIG. 3, the horizontal division and the vertical division is successively used for the current coding block, and thus, the current coding block is divided into a plurality of areas arranged in an array.

It should be noted that the current coding block can be divided horizontally and/or vertically N times, and each division-ratio is not limited, where N is a positive integer. For example, first, the current coding block may be quartering-horizontally divided into four areas, and then the four areas may be halving-vertically divided into eight areas.

Further, these areas may have the same size or different sizes. For example, one area includes sub-blocks arranged in an array of 4×4, and another area includes sub-blocks arranged in an array of 2×4.

Figure 4:
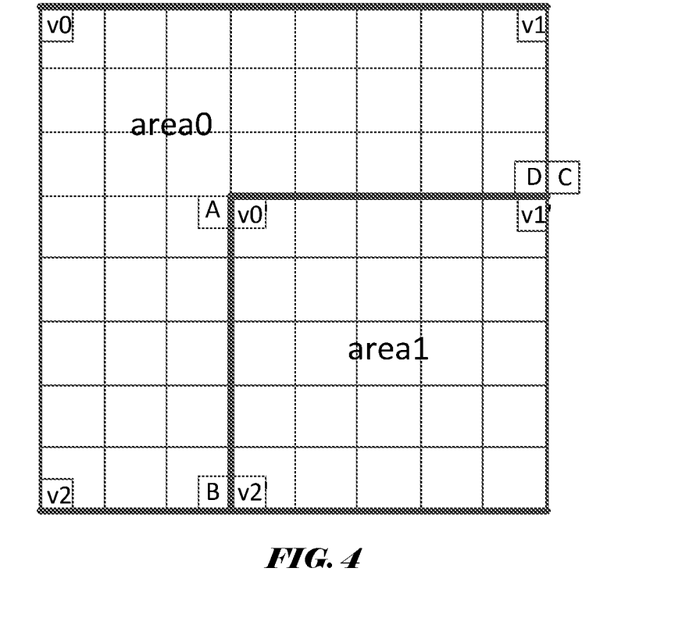
FIG. 4 is a schematic diagram of L-shaped division of a current coding block in the process of FIG. 1.

Further, these areas may also have the same shape or different shapes. For example, as shown in FIG. 4, L-shaped division is performed on the current coding block, and thus the current coding block is divided into a L-shaped area and a rectangular area. After the L-shaped division for the current coding block, the divided multiple areas include at least one L-shaped area. Of course, the number of times and sizes for the L-shaped division are not limited.

The above division manners can be applied for the current coding block to be divided.

At S13, the method sets a corresponding control point motion vector (CPMV) for a control point (CP) in each area.

A corresponding CPMV is set for a CP in each area. A MV of a sub-block where each control point is located is called as CPMV.

In the affine mode, for each sub-block in the current coding block, a MV of the sub-block is obtained as a corresponding CPMV in the current coding block is weighted according to a location relationship of the sub-block in the current coding block.

The affine prediction may include a 4-parameter affine prediction and a 6-parameter affine prediction. An upper-left point and an upper right point of the current coding block are used as control points in 4-parameter affine prediction, and an upper-left point, an upper-right point, and a lower-left point of the current coding block are used as control points in the 6-parameter affine prediction. The affine prediction mode can include two modes, i.e. the affine_AMVP mode and the affine_MERGE mode.

For the 4-parameter affine prediction, an upper-left point and an upper-right point of each area are used as new control points, and each control point corresponds to a CPMV. For the 6-parameter affine prediction, an upper-left point, an upper-right point, and a lower-left point of each area are used as new control points, and each control point corresponds to a CPMV.

If a to-be-set control point is a control point of the current coding block, a CPMV of the control point of the current coding block is used as a CPMV of the to-be-set control point. That is, after the current coding block is divided into multiple areas, if a to-be-set control point in an area is an original control point of the current coding block, an original CPMV of the current coding block is used as a CPMV of the to-be-set control point.

As shown in FIG. 2, in the 4-parameter affine_merge mode, the current coding block has a size of 32×32, which can be divided into 64 sub-blocks with a size of 4×4. The current coding block is horizontally divided into four areas 'area0', 'area1', 'area1', and area3'.

Both control points v0 and v1 in the area 'area0' are original control points of the current coding block, and then original CPMVs of the current coding block is used as CPMVs of the control points v0 and v1 that are to be set in the area 'area0', respectively.

As shown in FIG. 4, in the 6-parameter affine_AMVP mode, the current coding block has a size of 32×32, which can be divided into 64 sub-blocks with a size of 4×4. The current coding block is divided into two areas 'area0' and 'area1' through the L-shaped division once, where the area 'area0' is an L-shaped area, and the area 'area1' is a rectangular area.

All the three control points v0, v1, and v2 in the area 'area0' are original control points of the current coding block, and then original CPMVs of the current coding block are used as CPMVs of the control points v0, v1, and v2 that are to be set in the area 'area0', respectively.

Further, if a to-be-set control point is not a control point of the current coding block, a MV of a neighboring block, which is adjacent to a sub-block where the to-be-set control point is located, is used as a CPMV of the to-be-set control point. That is, after the current coding block is divided into multiple areas, if a to-be-set control point of an area is not an original control point of the current coding block, and a MV of any sub-block of the area can be calculated from a known CPMV of another area adjacent to the area, then a MV of a neighboring block in the another area, which is adjacent to the sub-block where the to-be-set control point is located, is used as a CPMV of the to-be-set control point. The neighboring block herein is a neighboring sub-block adjacent to the sub-block where the to-be-set control point is located in the current coding block.

As shown in FIG. 2, two control points v0' and v1' in the area 'area1' are not original control points of the current coding block, and CPMVs of two control points v0 and v1 are known in the area 'area0' adjacent to the area 'area1'. Thus, a MV of a sub-block A in the area 'area0', which is adjacent to a sub-block where the control point v0' is located, is calculated as a CPMV of the control point v0', and a MV of a sub-block B adjacent to a sub-block where the control point v1' is located is calculated as a CPMV of the control point v1'. Similarly, a CPMV of the respective control point in areas 'area2' and 'area3' can obtained. That is, a MV of a sub-block C in the area 'area1' is obtained as a CPMV of the control point v0'' in the area 'area2', a MV of a sub-block D in the area 'area1' is obtained as a CPMV of the control point v1'' in the area 'area1', a MV of a sub-block E in the area 'area2' is obtained as a CPMV of the control point v0''' in the area 'area3', and a MV of and sub-block F in the area 'area2' is obtained as a CPMV of the control point v1''' in the area 'area3'.

As shown in FIG. 4, three control points v0', v1', and v2' in the area 'area1' are not original control points of the current coding block, and CPMVs of the control points v0, v1 and v2 are known in the area 'area0' adjacent to the area 'area1'. Thus, a MV of a sub-block A in the area 'area0', which is adjacent to the left side of a sub-block where the control point v0' is located, is obtained as a CPMV of the control point v0', and a MV of a sub-block B in the area 'area0', which is adjacent to the left side of a sub-block where the control point v2' is located, is obtained as a CPMV of the control point v2'.

Further, the neighboring block may also be a coded block adjacent to the current coding block. That is, the neighboring block include a neighboring sub-block located in the current coding block and/or a coded block adjacent to the current coding block.

As shown in FIG. 4, it is detected whether a coded block C adjacent to the current coding block adopts inter prediction, where the coded block C is adjacent to a sub-block where the control point v1' is located. If the inter prediction mode which the coded block C adopts is a non-affine prediction mode, a MV of the coded block C is directly used as a CPMV of the control point v1', and if the coded block C adopts the affine prediction mode, a MV of a neighboring sub-block in the coded block C, which is adjacent to the sub-block where the control point v1' is located, is used as a CPMV of the control point v1'. For example, the neighboring sub-block is located at the upper-right of the sub-block where the control point v1' is located and adjacent to the sub-block.

If the coded block C is coded without inter prediction, a MV of a neighboring sub-block D in the area 'area0' is used as a CPMV of the control point v1', where the neighboring sub-block D is located at the upper side of the sub-block where the control point v1' is located and adjacent to the sub-block. Alternatively, a MV of any one of the coded block C and the neighboring sub-block D may be directly used as the CPMV of the control point v1'. The present disclosure does not limit a selecting-priority of the coded block C and the neighboring sub-block D.

Alternatively, a CPMV of a to-be-set control point is calculated using a CPMV of a neighboring block that is adjacent to an area where the to-be-set control point is located. That is, after the current coding block is divided into multiple areas, if a to-be-set control point of an area is not an original control point of the current coding block, and a CPMV of another area adjacent to the area is known, then the CPMV of the another area can be used to calculate a CPMV of the to-be-set control point.

As shown in FIG. 2, two control points v0 and v1 in the area 'area0' are original control points of the current coding block, and then an original CPMV of the current coding block is used as a respective CPMV of the control points v0 and v1 in the area 'area0'. The CPMV of control point v0 and the CPMV of control point v1 are used to predict MVs of sub-blocks in the area 'area0' and sub-blocks where the control points v0' and v1' are respectively located. The predicted MV of the sub-block where the control point v0' is located is used as a CPMV of the control point v0', and the predicted MV of the sub-block where the control point v1' is located is used as a CPMV of the control point v1' in the area 'area1'. A CPMV of a to-be-set control point in the area 'area1' and the area 'area3' is obtained similarly, which will not be repeated.

After the current coding block is divided into multiple areas, each area can also be regarded as a new and independent coding block, and a CPMV of each coding block is calculated based on the new coding block. That is, each area is treated as a new coding block, and a CPMV in each area is obtained based on the affine_AMVP mode or affine_MERGE mode. The affine_AMVP mode or affine_MERGE mode is for inter prediction in the specification of H.266 standard, and its specific implementation process will not be repeated herein.

At S14, the method affine-predicts MVs of sub-blocks in each area using the corresponding CPMV.

After the current coding block is divided into multiple areas, and a corresponding CPMV of each area is obtained in the above manner. The CPMV of each area is used to affine-predict MVs of sub-blocks in the area, and a MV of each sub-block in the area is calculated as the CPMV of the area is weighted according to a location relationship of the sub-block in the area. The affine prediction for each area is based on the affine_AMVP mode or the affine_MERGE mode, of which a basic prediction process includes constructing a motion vector candidate list of the area, performing motion estimation and motion compensation on the area based on the motion vector candidate list, determining information based on results of the motion estimation and motion compensation, for example, prediction direction, reference index, motion vector prediction (MVP), motion vector residual (MVD), and residual, and coding.

Further, rate-distortion costs of predicting the current coding block in which the current coding block is divided in different area-division manners are compared, and a prediction mode with less rate-distortion cost is used for coding the current coding block.

For example, the vertical division, horizontal division, and L-shaped division are used for the current coding block, respectively. Rate-distortion cost of predicting the current coding block in which the current coding block is divided in these division manners are compared, and a prediction mode with less rate-distortion cost is used to code the current coding block. Thus, this reduces impact of errors resulted from the division manner when the current coding block is predicted and coded.

Further, rate-distortion cost of predicting areas of the current coding block is compared with that of predicting the entire current coding block, and a prediction mode with less rate-distortion cost is used to code the current coding block. That is, the rate-distortion cost $RDCOST_{divide}$ of predicting areas of the current coding block is obtained, and the rate-distortion cost $RDCOST_0$ of predicting the whole current coding block in the affine_AMVP mode or the affine_MERGE mode is obtained. If $RDCOST_{divide}<RDCOST_0$, the above-mentioned area-division prediction is used for affine prediction of areas of the current coding block, and otherwise, a regular affine prediction mode (i.e. the affine_AMVP mode or the affine_MERGE mode) is used for affine prediction of the entire current coding block. Therefore, different affine prediction modes can be preferentially selected to predict the current coding block, which improves prediction accuracy of the current coding block.

Further, an identifier is set in a coding result of the current coding block, and the identifier is used to indicate whether area-division prediction is used for the current coding block, or which division manner is used for area-division prediction. Different identifiers indicate different prediction modes. That is. the identifier in the coding result indicates the prediction mode that is selected for coding the current coding block.

For example, a new flag AFFINE_DIVIDE is added to indicate whether affine area-division prediction is used for the current coding block.

If the flag AFFINE_DIVIDE is 0, it indicates that the whole current coding block is predicted in a regular mode. If the flag AFFINE_DIVIDE is 1, it indicates that the current coding block needs to be horizontally divided into multiple areas to be predicted. If the flag AFFINE_DIVIDE is 2, it indicates that the current coding block needs to be vertically divided into multiple areas to be predicted. The flag AFFINE_DIVIDE is 3, indicating that the current coding block needs to be L-shapedly divided into multiple areas to be predicted.

A label value of the flag AFFINE_DIVIDE can also be added to indicate a type of division manner, a division-ratio, etc.

Further, additional coding flag information may not be transmitted, but a width and a height of a coding block or texture characteristics of the coding block can be used to directly determine whether area-division prediction is required when the current coding block adopts affine prediction, or which division manner is used for area-division prediction. This can reduce code stream information that needs to be transmitted.

For example, when the current coding block adopts affine prediction, and the width and the height of the current coding block are greater than or equal to 32×32, the current coding block is forcibly divided into two areas to be predicted. When the height of the current coding block is greater than or equal to the width, the half-horizontal division is used. When the width of the current coding block is greater than the height, the halving-vertical division is used. Therefore, the division manner of the current coding block can be determined according to the width and height of the current coding block, which reduces code stream information for transmitting the division manner.

Different from the related art, in the affine prediction method, the current coding block is divided into multiple areas, a more suitable CPMV of each area is obtained, and MVs of sub-blocks in each area are affine-predicted using the CPMV of each area. Thus, no matter what a size of the current coding block is, due to the division of the current coding block, a distance between a sub-block in a respective area and a control point of the area can be controlled to be a suitable distance, and thus, this improves prediction accuracy of MVs of sub-blocks in the area using a CPMV of the area. Further, an image which adopts affine prediction may be a large coding block, without being divided into multiple small coding blocks for affine prediction, and thus, this saves codewords for coding the image and improves compression rate of image coding.

Figure 5:
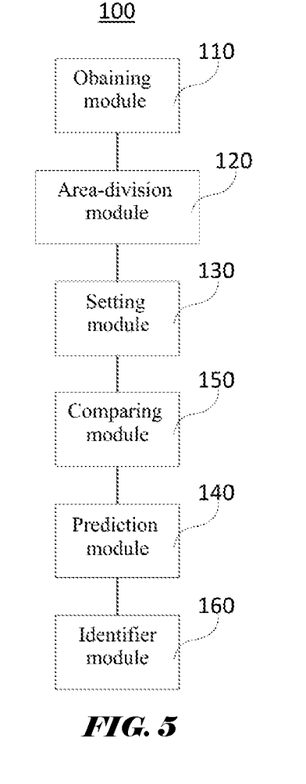
FIG. 5 is a schematic diagram of an affine prediction apparatus according to some embodiments of the present disclosure.

FIG. 5 is a schematic diagram an affine prediction apparatus according to some embodiments of the present disclosure. As shown in FIG. 5, the apparatus 100 includes an obtaining module 110, an area-division module 120, a setting module 130, and a prediction module 140.

The obtaining module 110 is configured for obtaining a current coding block comprising a plurality of sub-blocks arranged in an array.

The area-division module 120 is configured for dividing the current coding block into at least two areas, where each area of the at least two areas comprises at least two of the sub-blocks.

In some embodiments, the at least two areas are arranged in at least one of a row direction and a column direction of the sub-blocks.

In some embodiments, at least one of shapes and sizes of the at least two areas are same or different.

In some embodiments, the at least two areas comprise at least one L-shaped area.

The setting module 130 is configured for setting a corresponding control point motion vector (CPMV) for one or more control points in the each area, respectively.

The prediction module 140 is configured for affine-predicting motion vectors (MVs) of the at least two of the sub-blocks in the each area, using the corresponding CPMV.

The setting module 130 may be specifically configured to set a CPMV of a control point of the current coding block as a CPMV of a to-be-set control point, in response to the to-be-set control point being the control point of the current coding block.

The setting module 130 is further configured to set a MV of a neighboring block adjacent to a sub-block where the to-be-set control point is located as the CPMV of the to-be-set control point, in response to the to-be-set control point not being the control point of the current coding block, or calculate the CPMV of the to-be-set control point using CPMVs in a neighboring area adjacent to an area where the to-be-set control point is located. The neighboring block comprises at least one of a neighboring sub-block in the current coding block and a coded block adjacent to the current coding block.

The setting module 130 may also be used for setting the each area as a new coding block, and calculating the corresponding CPMV based on the new coding block.

The apparatus 100 also includes a comparing module 150, which is used for comparing rate-distortion cost of predicting the at least two areas of the current coding block with that of predicting the entire current coding block. The prediction module 140 selects a prediction mode with less rate-distortion cost for coding the current coding block.

Further, the comparing module 150 is further configured for comparing rate-distortion costs of predicting the current coding block which is divided in different division manners, and the prediction module 140 selects a prediction mode with less rate-distortion cost for coding the current coding block.

The apparatus 100 further includes an identifier module 160, which is used for setting an identifier in a coding result of the current coding block, wherein the identifier indicates the prediction mode that is selected for coding the current coding block.

Figure 6:
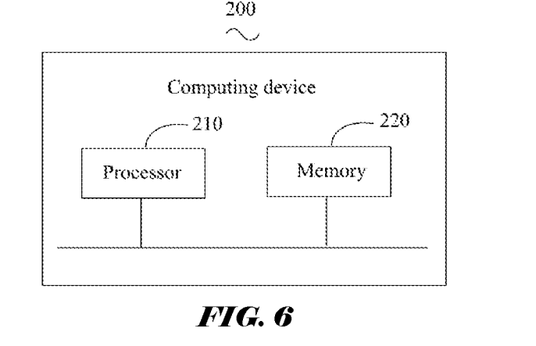
FIG. 6 is a schematic diagram a computing device according to some embodiments of the present disclosure.

The present disclosure also provides a computing device 200. FIG. 6 is a schematic diagram of a computing device according to some embodiments of the present disclosure. In this embodiment, the computing device 200 includes a processor 210 and a memory 220. The processor 210 is coupled to the memory 220, and the memory 220 is used to store programs, and the processor 210 is used to execute the programs to implement the method of any of the foregoing embodiments.

The computing device 200 may be a codec. The processor 210 may also be referred to as a CPU (Central Processing Unit). The processor 210 may be an integrated circuit chip with signal processing capability. The processor 210 may also be a general-purpose processor, a digital signal processor (DSP), an application specific integrated circuit (ASIC), a field programmable gate array (FPGA) or other programmable logic device, a discrete gate or transistor logic device, or a discrete hardware component. The general-purpose processor 110 may be a microprocessor or any conventional processor.

Figure 7:
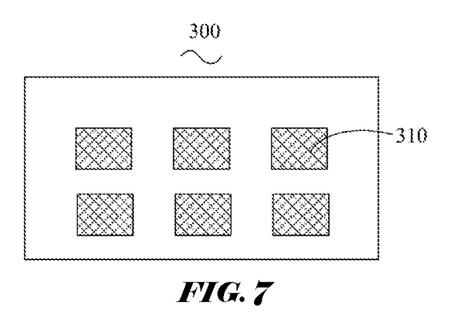
FIG. 7 is a schematic diagram of a storage device according to some embodiments of the present disclosure.

The present disclosure also provides a storage device 300. FIG. 7 is a schematic diagram of a storage device according to some embodiments of the present disclosure. In this embodiment, the storage device 300 stores programs 310, and when the programs 310 is executed, the method of any of the foregoing embodiments can be realized.

The programs 310 may be stored in the afore-mentioned storage device 300 in the form of a software product, and include several instructions to enable a device or processor to execute all or part of actions/operations of the methods of the present disclosure.

The storage device 300 is a medium for storing a certain discontinuous physical quantity in a computer memory. The afore-mentioned storage device 300 with a storage function includes U disk, mobile hard disk, read-only memory (ROM), random access memory (RAM), magnetic disks or optical disks, or other media, which is used for storing code of the programs 310.

In several embodiments provided in the present disclosure, it should be understood that, the disclosed system, device, and method may be implemented in other ways. For example, the device described above are merely illustrative, for example, the division of units is only a logical function division, and there may be other divisions in actual implementation, for example, multiple units or components can be combined or integrated into another system, or some features can be ignored or not implemented. In addition, the displayed or discussed mutual coupling or direct coupling or communication connection may be indirect coupling or communication connection through some interfaces, devices, or units, and may be in electrical, mechanical, or other forms.

The units described as separate components may or may not be physically separated, and the components displayed as units may or may not be physical units. That is, they may be located at one place, or they may be distributed on multiple network units. Some or all of the units may be selected according to actual needs to achieve the objectives of the solutions of this embodiment.

In addition, the functional units in the various embodiments of the present disclosure may be integrated into one processing unit, or each unit may exist alone physically, or two or more units may be integrated into one unit. The above-mentioned integrated unit can be implemented in the form of hardware or software functional unit.

If an integrated unit is implemented in the form of a software functional unit and sold or used as an independent product, it can be stored in a computer readable storage medium. Based on this understanding, the technical solution of this application essentially can be embodied in the form of a software product, or the part that contributes to the existing technology or all or part of the technical solution can be embodied in the form of a software product. The software product is stored in a storage medium, which includes several instructions to make a computing device (which may be a personal computer, a server, or a network device, etc.) or a processor execute all or part of actions/operations of the methods described in the various embodiments of the present disclosure.

The above are only implementations of the present disclosure, and do not limit the scope of the present disclosure. Any equivalent structure or equivalent process transformation made by using the description and drawings of the present disclosure, or directly or indirectly applied to other related technical fields, are included in the scope of the present disclosure similarly.

What is claimed is:

1. An affine prediction method for predicting a coding block, comprising:
   obtaining a current coding block comprising a plurality of sub-blocks arranged in an array;
   dividing the current coding block into at least two areas, wherein each area of the at least two areas comprises two or more of the plurality of sub-blocks;
   setting a corresponding control point motion vector (CPMV) for each of one or more control points in each area of the at least two areas, respectively; and
   affine-predicting motion vectors (MVs) of the two or more of the plurality of sub-blocks in each area of the at least two areas, using the corresponding CPMV,
   wherein for each of the one or more control points in the each area, in response to the control point of the each area being an original control point of the current coding block, a CPMV of the original control point of the current coding block is used as the CPMV of the control point of the each area; and
   for one of the one or more control points in one of the at least two areas, in response to the control point of the one area being not the original control point of the current coding block, and in response to a MV of any sub-block of the one area being able to be calculated from a known CPMV of another one of the at least two areas adjacent to the one area, a MV of a sub-block, which is located in the another area and is adjacent to a sub-block where the control point is located, is used as the CPMV of the control point of the one area.

2. The method of claim 1, wherein the at least two areas are arranged in at least one of a row direction and a column direction of the sub-blocks.

3. The method of claim 1, wherein at least one of shapes and sizes of the at least two areas are same or different.

4. The method of claim 3, wherein the at least two areas comprise at least one L-shaped area and a rectangular area, the rectangular area comprises at least one control point adjacent to the L-shaped area.

5. The method of claim 1, wherein the neighboring block comprises at least one of a neighboring sub-block in the current coding block and a coded block adjacent to the current coding block.

6. The method of claim 1, wherein the setting a corresponding control point motion vector (CPMV) comprises:
setting the each area as a new coding block, and calculating the corresponding CPMV based on the new coding block.

7. The method of claim 1, further comprising:
comparing rate-distortion cost of a first prediction mode of predicting the at least two areas of the current coding block with that of a second prediction mode of predicting the current coding block as a whole; and
selecting one of the first prediction mode and the second prediction mode that has less rate- distortion cost than that of another of the first prediction mode and the second prediction mode as a prediction mode for coding the current coding block.

8. The method of claim 1, further comprising:
comparing rate-distortion costs of a plurality of prediction modes of predicting the current coding block, wherein the current coding block is divided in different division manners in different ones of the plurality of prediction modes; and
selecting a prediction mode of the plurality of prediction modes with less rate-distortion cost than those of other prediction modes of the plurality of prediction modes for coding the current coding block.

9. The method of claim 7, further comprising:
setting an identifier in a coding result of the current coding block, wherein the identifier indicates the prediction mode that is selected for coding the current coding block.

10. A computing device comprising a processor and a memory, the processor being coupled to the memory, and the memory being configured for storing programs, when executed by the processor, causes the processor to implement:
obtaining a current coding block comprising a plurality of sub-blocks arranged in an array;
dividing the current coding block into at least two areas, wherein each area of the at least two areas comprises two or more of the plurality of sub-blocks;
setting a corresponding control point motion vector (CPMV) for each of one or more control points in each area of the at least two areas, respectively; and
affine-predicting motion vectors (MVs) of the two or more of the plurality of sub-blocks in each area of the at least two areas, using the corresponding CPMV,
wherein for each of the one or more control points in the each area, in response to the control point of the each area being an original control point of the current coding block, a CPMV of the original control point of the current coding block is used as the CPMV of the control point of the each area; and
for one of the one or more control points in one of the at least two areas, in response to the control point of the one area being not the original control point of the current coding block, and in response to a MV of any sub-block of the one area being able to be calculated from a known CPMV of another one of the at least two areas adjacent to the one area, a MV of a sub-block, which is located in the another area and is adjacent to a sub-block where the control point is located, is used as the CPMV of the control point of the one area.

11. The computing device of claim 10, wherein the at least two areas are arranged in at least one of a row direction and a column direction of the sub-blocks.

12. The computing device of claim 10, wherein the at least two areas comprise at least one L-shaped area and a rectangular area, the rectangular area comprises at least one control point adjacent to the L-shaped area.

13. The computing device of claim 10, wherein the one or more control points comprises a first control point; and
a CPMV of a control point of the current coding block is set as a CPMV of the first control point, in response to the first control point being the control point of the current coding block.

14. The computing device of claim 13, wherein a MV of a neighboring block adjacent to a sub-block where the first control point is located is set as the CPMV of the first control point, in response to the first control point not being the control point of the current coding block; or
the CPMV of the first control point is calculated using CPMVs in a neighboring area adjacent to an area where the first control point is located.

15. The computing device of claim 14, wherein the neighboring block comprises at least one of a neighboring sub-block in the current coding block and a coded block adjacent to the current coding block.

16. The computing device of claim 10, wherein the processor is caused to further implement:
comparing rate-distortion cost of a first prediction mode of predicting the at least two areas of the current coding block with that of a second prediction mode of predicting the entire current coding block as a whole; and
selecting one of the first prediction mode and the second prediction mode that has less rate-distortion cost than that of another of the first prediction mode and the second prediction mode as a prediction mode for coding the current coding block.

17. The computing device of claim 16, wherein an identifier is set in a coding result of the current coding block, wherein the identifier indicates the prediction mode that is selected for coding the current coding block.

18. A non-transitory storage medium storing programs, when executed, causes to implement:
obtaining a current coding block comprising a plurality of sub-blocks arranged in an array;
dividing the current coding block into at least two areas, wherein each area of the at least two areas comprises two or more of the plurality of sub-blocks;
setting a corresponding control point motion vector (CPMV) for each of one or more control points in each area of the at least two areas, respectively; and
affine-predicting motion vectors (MVs) of the two or more of the plurality of sub-blocks in each area of the at least two areas, using the corresponding CPMV,
wherein for each of the one or more control points in the each area, in response to the control point of the each area being an original control point of the current coding block, a CPMV of the original control point of the current coding block is used as the CPMV of the control point of the each area; and
for one of the one or more control points in one of the at least two areas, in response to the control point of the one area being not the original control point of the current coding block, and in response to a MV of any sub-block of the one area being able to be calculated from a known CPMV of another one of the at least two areas adjacent to the one area, a MV of a sub-block, which is located in the another area and is adjacent to a sub-block where the control point is located, is used as the CPMV of the control point of the one area.

* * * * *